No. 771,273. PATENTED OCT. 4, 1904.
C. T. ROWLAND & L. F. LONGMORE.
MACHINE FOR SEPARATING AND PURIFYING GRANULATED MATERIALS.
APPLICATION FILED SEPT. 14, 1901. RENEWED FEB. 27, 1904.
NO MODEL.
3 SHEETS—SHEET 2.
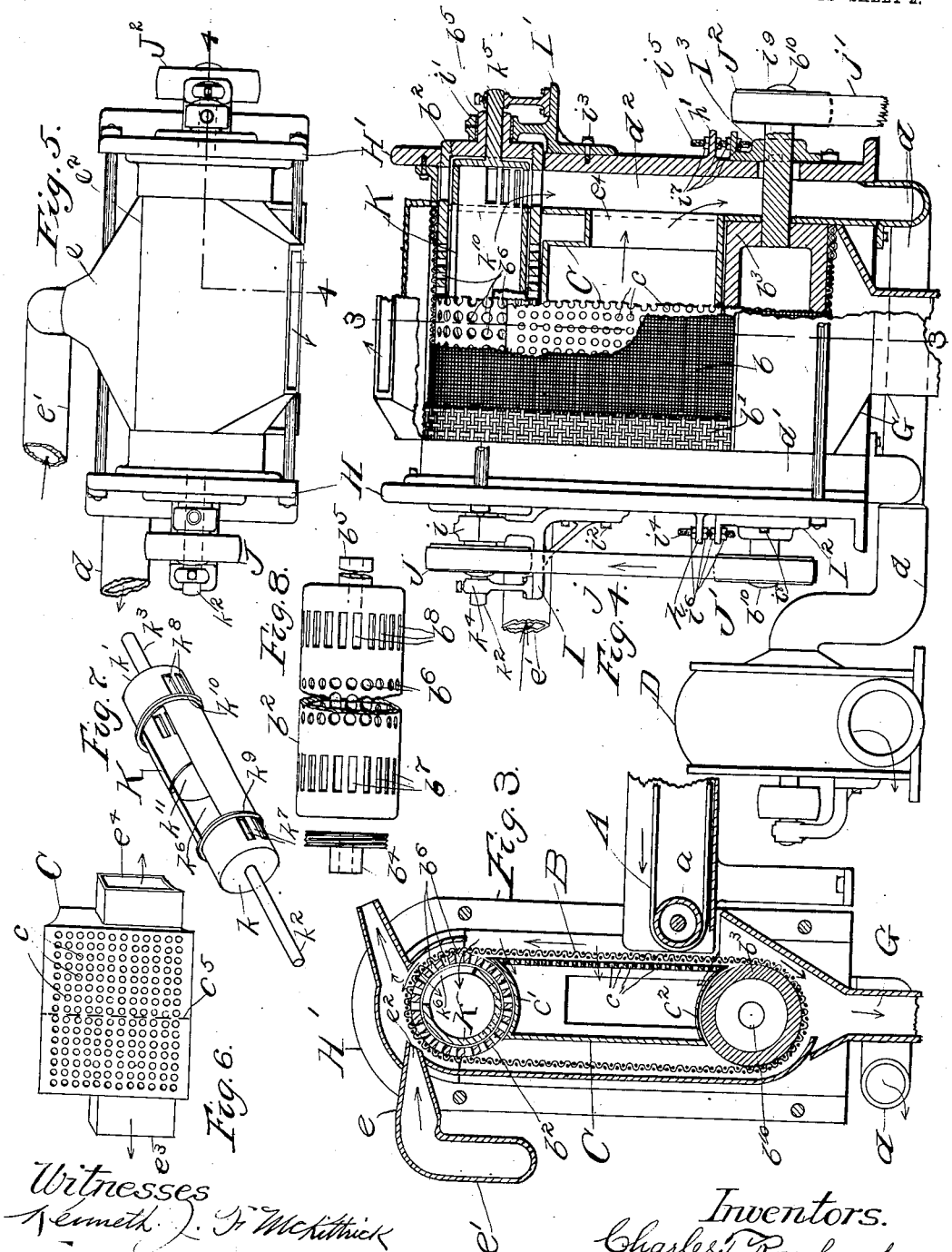
Witnesses
Kenneth J. F. McKittrick
Anna T. Halloran.
Inventors.
Charles T. Rowland &
Lewis F. Longmore,
By Albert M. Moore,
Their Attorney.

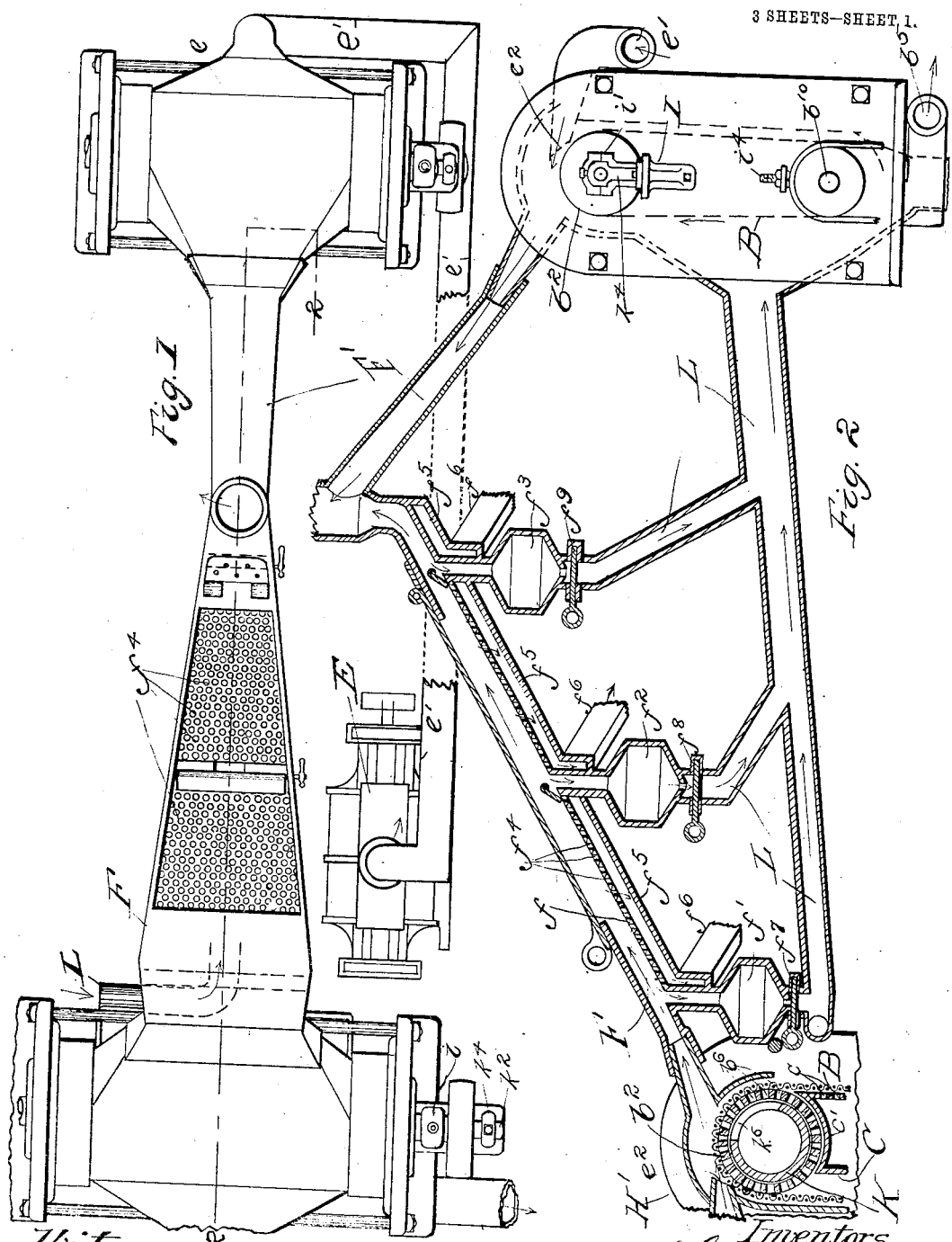

No. 771,273. PATENTED OCT. 4, 1904.
C. T. ROWLAND & L. F. LONGMORE.
MACHINE FOR SEPARATING AND PURIFYING GRANULATED MATERIALS.
APPLICATION FILED SEPT. 14, 1901. RENEWED FEB. 27, 1904.
NO MODEL.
3 SHEETS—SHEET 3.

Witnesses.
Kenneth J. F. McKittrick.
Anna T. Halloran.

Inventors.
Charles T. Rowland
& Lewis F. Longmore
By Albert M. Moore,
Their Attorney.

No. 771,273. Patented October 4, 1904.

UNITED STATES PATENT OFFICE.

CHARLES T. ROWLAND AND LEWIS F. LONGMORE, OF LOWELL, MASSACHUSETTS; SAID LONGMORE ASSIGNOR TO SAID ROWLAND.

MACHINE FOR SEPARATING AND PURIFYING GRANULATED MATERIALS.

SPECIFICATION forming part of Letters Patent No. 771,273, dated October 4, 1904.

Application filed September 14, 1901. Renewed February 27, 1904. Serial No. 195,674. (No model.)

*To all whom it may concern:*

Be it known that we, CHARLES T. ROWLAND and LEWIS F. LONGMORE, citizens of the United States, residing in Lowell, in the county of Middlesex and Commonwealth of Massachusetts, have invented a certain new and useful Improvement in Machines for Separating and Purifying Granulated Materials, of which the following is a specification.

This invention relates to machines for separating and purifying granulated materials; and it consists in the combinations and devices hereinafter described and claimed.

This invention comprises a traveling reticulated or foraminous belt, means of sucking the granulated material against said belt and drawing the dust out of said material through said belt, and means of subsequently blowing the material too coarse to pass through the belt from the belt over pockets in which the heavier particles are deposited.

Figure 9:
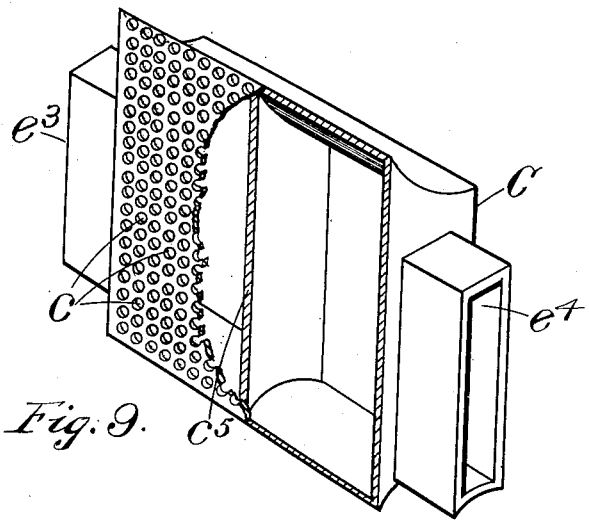
Figure 10:
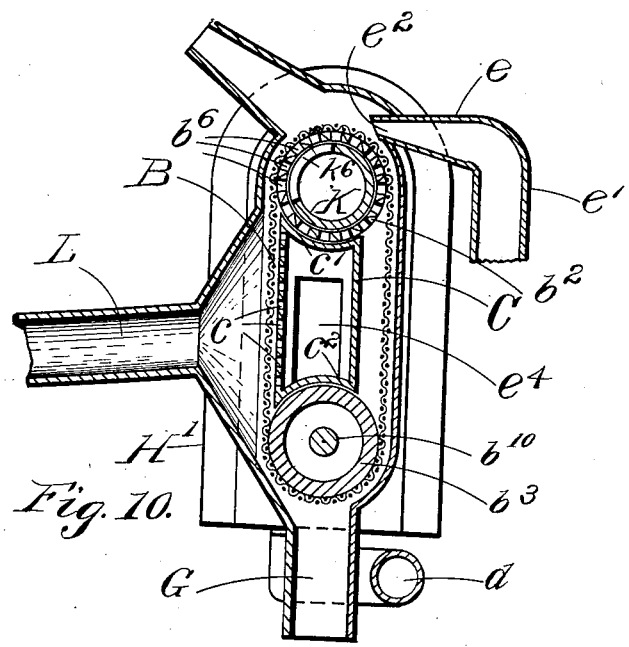

In the accompanying drawings, on two sheets, Figure 1 is a plan of our machine with the cover open or removed; Fig. 2, a vertical longitudinal section of the same on the line 2 2 in Fig. 1; Fig. 3, a longitudinal section on the line 3 3 in Fig. 4 of the first section of the machine; Fig. 4, a front elevation of the same, partly in vertical section, on the line 4 4 in Fig. 5; Fig. 5, a plan view of the same; Fig. 6, an oblique view of the suction-box; Fig. 7, an oblique view of the damper of the slot $d$ and cylinder; Fig. 8, a front elevation of the perforated cylinder; Fig. 9, an enlarged oblique view of the suction-box with a part of the perforated front removed to show the partition; Fig. 10, a vertical central longitudinal section of the second section of the machine.

The granulated or crushed material (as crushed rock containing flakes of plumbago or mica) is fed in any convenient manner upon an endless apron A, Fig. 3, running upon apron-rolls $a$ (only one of which is shown) in a well-known manner common to a great variety of machines.

The apron A carries the material to a vertical endless apron B, supported upon other apron-rolls $b^2 b^3$, the lower $b^3$ of which rolls is of any ordinary construction, while the upper roll $b^2$ is hollow and is provided with hollow journals $b^4 b^5$ and with perforations $b^6$ in its middle portion and with longitudinal slits $b^7 b^8$ near the ends of its curved surface.

The apron B is of reticulated or foraminous material, as wire-cloth $b$, with marginal strips $b'$ of textile fabric secured to the edges of said wire-cloth to keep the edges of said cloth from being frayed or torn.

A suction-box C, Figs. 2, 3, 4, 6, and 9, having a perforated vertical front $c$, is arranged between the rolls $b^2 b^3$ inside the apron B, with said front $c$ parallel with and in close proximity to the front or rising member of said apron and extending into the angles between said rolls and said front member, the top $c'$ and bottom $c^2$ of said suction-box being concave concentrically with said rolls and being almost in contact with them to prevent as far as possible the passage of air between said rolls and said suction-box.

The perforations of the box C are much coarser than the meshes of the wire-cloth apron B, and the air is drawn from said box through the ends thereof by pipes $c^3 c^4$, which communicate with the pipes $d' d^2$, connected with the trunk $d$, the latter being exhausted by a suction-fan D or other suitable means. Any dust or material brought against the apron B by the apron A and fine enough to pass through the meshes of the apron B will be drawn into the suction-box C and thence into the fan D and will be expelled from the latter into any suitable dust room or place, while light or flaky material too coarse to pass through the apron B will be retained on the rising member thereof by suction, while the remaining coarser and heavier materials will fall down through the space between the two aprons A B and into and through a chute G and be delivered into any suitable place or waste-receptacle. The lighter coarse or flaky material will be carried by the travel of the apron B upward as high as the top of the suction-box C and above said suction-box is still retained on said apron B by the suction of said fan D, which by means of the pipes $d' d^2$ and trunk $d$, above named, exhausts the top apron-roll $b^2$ through the slits $b^7$ $b^8$, causing the air to pass through the meshes of apron B and through the perforations $b^6$ to supply the place of the air exhausted from said top apron-roll, the upper ends of the pipes $d'$ $d^2$ opening upon and fitting the curved surface of said top apron-roll and surrounding said roll at said slits, as shown in Figs. 3 and 4.

The hubs $b^4$ $b^5$ of the upper roll $b^2$ are hollow and turn in journal-boxes $i$ $i'$, formed on the upper ends of brackets I I', secured, as by bolts $i^2$ $i^3$, to the sides H H' or frame of the machine, one of said hubs being long enough to support a fast pulley J, connected by belt $j$ to another pulley J', fast on the shaft $b^{10}$ of the lower roll $b^3$. The shaft $b^{10}$ of the lower roll $b^3$ has another fast pulley $J^2$, connected by a belt $j'$ to any suitable motor. The shaft $b^{10}$ turns in journal-boxes $I^2$ $I^3$, adjustably secured on the sides H H' of the machine and raised or lowered by vertical screws $i^4$ $i^5$, which turn in said boxes and in projections $h$ $h'$ on the frame, said screws being prevented from accidental turning by nuts $i^6$ $i^7$. When these nuts are loosened, the lower roll $b^3$ may be raised or lowered into parallelism with the roll $b^2$ or to take up any slack in the apron B. After adjustment the boxes $I^2$ $I^3$ are held in place by tightening the nuts $i^6$ $i^7$ and by bolts $i^8$ $i^9$, driven through slots in said boxes and into the sides H H'.

A damper K, (best shown in Fig. 7,) consisting of a segment of a hollow cylinder with closed ends $k$ $k'$ and hubs $k^2$ $k^3$, which fit and project through the hubs $b^4$ $b^5$ of the roll $b^2$ and through stands $k^4$ $k^5$, is supported on the brackets I I', as shown in Fig. 4. The damper is provided with suitable openings, represented as slits $k^7$ $k^8$, corresponding in size and position with the slits $b^7$ $b^8$ in the roll $b^2$, so that the slits $k^7$ $k^8$ in the damper may be made to coincide with the slits in said roll when the latter is at rest. The curved part of the damper has a longitudinal opening $k^6$, which is at least as long as from edge to edge of the wire-cloth portion $b$ of the apron B and of an angular width of from ninety degrees to one hundred and twenty degrees or from the top of the suction-box to the top of the roll $b^2$.

The damper K nearly fills the roll $b^2$, and the space between them is properly packed at the inner ends of the slits $b^7$ $b^8$ $k^7$ $k^8$ to compel the air to pass out of said slits and into the perforations $b^6$ and opening $k^6$ by means of annular ribs $k^9$ $k^{10}$ on said damper, which fills said space, Figs. 4 and 7. By turning the damper the upper edge of the opening $k^6$ may be brought nearer to the top of the suction-box, cutting off the suction below the top of the roll $b^2$ or continuing the suction until the material on the apron is carried beyond or back of the top of said roll; but it is thought better to stop the suction at the top of said roll.

The material which arrives at the top of the roll $b^2$ is blown therefrom by a blast of air from the nozzle $e$ of a pipe $e'$, which leads from a pressure fan or blower E, said nozzle having a thin discharge-opening $e^2$, which extends across the wire-cloth portion $b$ of the apron B at or slightly back of the line where the suction of the fan D ceases to be effective. The blast from the blower E carries the material not previously disposed of into the pipe F, causing the lighter parts or parts of the material most easily carried by the air by reason of their shape to pass entirely through said pipe and to be discharged into any suitable room or receptacle, the heavier portions falling on the false bottom $f$ of said pipe F, said pipe being inclined upward as it recedes from the nozzle $e$. The false bottom $f$ is provided with pockets $f'$ $f^2$ $f^3$, which cross said bottom $f$, and between said pockets is perforated at $f^4$, Figs. 1 and 2, so that sand and small pieces of rock falling on said inclined bottom will roll down the same and be sifted through the perforations thereof, while the material too coarse and heavy to pass through the perforations $f^4$ will roll into said pockets. The sand which falls through the perforations $f^4$ will fall on and roll down another bottom, $f^5$, arranged below and parallel with the false bottom $f$, into downwardly-inclined spouts $f^6$ and be carried by its own gravity to any suitable waste receiver or place. The material which falls into a pocket $f'$ $f^2$ $f^3$ may be discharged by drawing a slide $f^7$ $f^8$ $f^9$, with which each pocket is provided, allowing the contents of said pocket to fall or be sucked into a pipe L, with which all said pockets communicate, into a second section or machine which is substantially like the first, except that while the first section is open in front of the vertical apron the second section is inclosed in front of its apron except when the pipe L introduces the material from the pockets $f'$ $f^2$ $f^3$. The material introduced by the pipe L too heavy to be raised by the vertical apron of the second section falls below the lower feed-roll of said apron out of the machine. The fine dust is taken care of by the same exhaust-fan D through the pipe $d^5$, and the light or flaky material is carried up the pipe F' into the pipe and disposed of with material from said pipe F, as above described.

It is preferred to divide the suction-box C by a partition $c^5$ midway between its ends, so that the exhaustion will be more uniform and the material be held on the apron across its entire width in a layer of comparatively uniform thickness, and for the same reason the damper $b^2$ is provided with a partition $k^{11}$, which divides the space between said roll and the damper K, and said damper is divided into equal parts by a partition $k^{11}$.

We claim as our invention—

1. The combination of an apron of foraminous or reticulated fabric, upper and lower apron-rolls, supporting the same, said upper roll being hollow and having perforations on its apron-supporting portion, and means of exhausting the air from said upper roll near the ends thereof, said upper roll having an air-tight partition, midway between its ends and at right angles to its axis, to cause said upper roll to be exhausted equally on opposite sides of said partition.

2. The combination of an apron of foraminous or reticulated fabric, an upper apron-roll, hollow and perforated in its apron-supporting portion, a damper, arranged in said roll and having a longitudinal opening to allow air to be drawn through a part of said perforated portion into said damper, said damper and said apron each having openings beyond the margins of said apron, and means of exhausting said damper and said roll through said last-named openings.

3. The combination of an apron of foraminous or reticulated fabric, an upper apron-roll, hollow and perforated in its apron-supporting portion, a damper, arranged in said roll and having a longitudinal opening to allow air to be drawn through a part of said perforated portion into said damper, said damper and said apron each having openings beyond the margins of said apron, and having partitions midway between their ends, and means of exhausting said damper and said roll through said last-named openings equally on opposite sides of said partitions.

4. The combination of an inclined conducting-pipe, means of blowing crushed or granulated material into the lower end of said pipe, transverse pockets opening out of said pipe, doors or slides normally closing said pockets, another pipe, communicating with said pockets, when said doors are opened, and leading to and discharging upon the rising member of a traveling endless apron of reticulated or foraminous fabric, said apron, means of causing a suction through said apron, to draw the dust out of said material and to retain other parts of said material upon said apron, means of blowing the material raised by said apron off from said apron, and another pipe, to conduct the material blown from said apron to said first-named pipe above said pockets.

In testimony whereof we have affixed our signatures in presence of two witnesses.

CHARLES T. ROWLAND.
LEWIS F. LONGMORE.

Witnesses:
ALBERT M. MOORE,
ANNA T. HALLOR.